(12) United States Patent
Wullaert

(10) Patent No.: US 12,116,300 B1
(45) Date of Patent: Oct. 15, 2024

(54) SYSTEMS, METHODS, AND APPARATUS FOR GENERATING FUNCTIONAL HYDROGEN WATER

(71) Applicant: NT Liquid Systems, LLC, Fort Lauderdale, FL (US)

(72) Inventor: Richard A. Wullaert, New Port Richey, FL (US)

(73) Assignee: NT Liquid Systems, LLC, Fort Lauderdale, FL (US)

( * ) Notice: Subject to any disclaimer, the term of this patent is extended or adjusted under 35 U.S.C. 154(b) by 0 days.

(21) Appl. No.: 18/376,805

(22) Filed: Oct. 4, 2023

(51) Int. Cl.
*C02F 9/00* (2023.01)
*C02F 1/32* (2023.01)
(Continued)

(52) U.S. Cl.
CPC ................ *C02F 9/00* (2013.01); *C02F 1/001* (2013.01); *C02F 1/32* (2013.01); *C02F 1/441* (2013.01);
(Continued)

(58) Field of Classification Search
CPC .... C02F 9/00; C02F 1/001; C02F 1/32; C02F 1/441; C02F 1/46109; C02F 1/48; C02F 1/68; C02F 2001/46138; C02F 2001/46157; C02F 1/30; C02F 1/461; C02F 1/681; B01D 36/00; B01D 36/02; B01D 37/00; B01D 61/02; B01D 61/04;
(Continued)

(56) References Cited

U.S. PATENT DOCUMENTS

| 10,071,920 B2 | 9/2018 | Hanaoka | |
|---|---|---|---|
| 10,897,920 B1 * | 1/2021 | Guoin | A23L 2/74 |
| 2020/0121715 A1 * | 4/2020 | Bishop | A61K 33/00 |

FOREIGN PATENT DOCUMENTS

| CN | 105884091 A | * | 8/2016 | C02F 9/00 |
|---|---|---|---|---|
| CN | 106396166 A | * | 2/2017 | C02F 9/00 |

(Continued)

OTHER PUBLICATIONS

English Translation of Wu publication CN205933500U, published Feb. 2017. (Year: 2017).*

(Continued)

*Primary Examiner* — Joseph W Drodge
(74) *Attorney, Agent, or Firm* — Lippes Mathias LLP; Mitchell Ghaneie; Josephine Chen

(57) ABSTRACT

The present disclosure provides for systems, methods, and apparatus for generating functional hydrogen water. According to the present disclosure, a method for generating functional hydrogen water may comprise subjecting at least one amount of water to at least one reverse osmosis process to generate at least one amount of RO water, adding one or more additive elements to the RO water to generate at least one amount of treated water, and applying at least one external energy field to the treated water to generate at least one amount of functional hydrogen water. In some aspects, the generated functional hydrogen water may comprise increased concentrations of hydrogen and oxygen gas, which may provide one or more health benefits to a user upon consumption of the functional hydrogen water, such as enhanced hydration, relief from gastrointestinal issues, and reduced inflammation, as non-limiting examples.

16 Claims, 12 Drawing Sheets

(51) Int. Cl.
*C02F 1/44* (2023.01)
*C02F 1/46* (2023.01)
*C02F 1/48* (2023.01)
*C02F 1/68* (2023.01)
*C02F 1/00* (2023.01)
*C02F 1/461* (2023.01)

(52) U.S. Cl.
CPC ............... *C02F 1/46109* (2013.01); *C02F 2001/46138* (2013.01); *C02F 2001/46157* (2013.01); *C02F 1/48* (2013.01); *C02F 1/68* (2013.01)

(58) Field of Classification Search
CPC .... B01D 2311/2603; B01D 2311/2607; B01D 2311/2611; B01D 2311/2615; B01D 2311/2619; B01D 2311/2684; B01D 2311/04; B01D 2311/06
See application file for complete search history.

(56) References Cited

FOREIGN PATENT DOCUMENTS

| CN | 205933500 U | * | 2/2017 | ................ C02F 9/00 |
| CN | 107459203 A | * | 12/2017 | ................ C02F 9/00 |
| CN | 113354038 A | * | 6/2022 | .......... C02F 1/46109 |
| CN | 115087623 A | * | 9/2022 | .......... C02F 1/46109 |
| JP | 2007167829 A | | 7/2007 | |
| JP | 2017196559 A | | 7/2017 | |
| JP | 2020063464 A | | 4/2020 | |
| JP | 2021112730 A | | 8/2021 | |

OTHER PUBLICATIONS

English Translation of Huang publication CN106396166A, published Feb. 2017. (Year: 2017).*
English Translation of Liu publication CN107459203A, published Dec. 2017. (Year: 2017).*
English Translation of Sires publication CN115087623A, published Sep. 2022. (Year: 2022).*
English Translation of Gao publication CN113354038B, published Jun. 2022. (Year: 2022).*
English Translation of Patent Publication CN 105884091A, published Aug. 2016. (Year: 2016).*

* cited by examiner

300

SYSTEMS, METHODS, AND APPARATUS FOR GENERATING FUNCTIONAL HYDROGEN WATER

BACKGROUND

Water is a necessity for life. Human civilizations have routinely developed near freshwater sources such as rivers and lakes so that their populations could have a steady supply from which to wash and drink. Before more advanced water treatment techniques and technologies were developed, the level of clarity of water was the primary indicator for whether the water was clean and safe to consume. By focusing on the appearance and the taste of water to determine its quality, the underlying invisible aspects of the water's composition went neglected. In fact, it was only within the last 200 years that water treatment technologies, such as those implemented for use in municipal water treatment, have rapidly evolved to focus on the analytical chemistry of water intended for human use.

Historically, the emphasis of municipal water treatment has been to remove the "bad" contaminants (e.g., biological, chemical, or mineral contaminants) from source water and, in some cases, add various beneficial minerals thereto to deliver potable water for human consumption. However, in many cases not all the contaminants are successfully removed, and additional contaminants (e.g., lead) can be picked up by the treated water as it gets distributed to (and within) a residential or commercial building. This has generated a need for point-of-use ("POU") water treatment systems, such as reverse osmosis ("RO") systems. In most cases, a small amount of minerals needs to be added to the RO water to provide electrolytes required to make the water healthy to drink.

More recently, processes for treating water have started including steps to "functionalize" the water to prepare the water for various uses, such as a cleaning agent, disinfectant, activating solution, or an enhanced drinking water. This has led Japan to form the Functional Water Foundation ("FWF") to provide standards, meetings, and publications to add science-backed support to different types of claims being made by the manufacturers of functional water systems. Functional water is defined by the FWF as water that has been exposed to external energy fields (e.g., electrical, magnetic, vortex, sound, light, etc.) to enable the water to produce a desired health benefit when consumed or to provide one or more industrial benefits when used.

Typically, systems for generating functional water have been configured as countertop electrolyzers that include a membrane between the anode and the cathode. These systems produce two product waters: a cathode alkaline drinking water with a pH of approximately 9.5 and an anode acid water with a pH of approximately 4.5. The Japanese Health Ministry has approved several medical claims for the electrolyzed alkaline water. The health benefits of the electrolyzed alkaline water were originally attributed to the water's high pH, which alkalized the body, and later attributed to the water's negative oxidation reduction potential ("ORP"), which served as an antioxidant within the body. These early systems are referred to herein as "Generation 1 machines," which have been in existence for approximately 30 years.

Eventually, it was hypothesized that the health benefits documented for electrolyzed alkaline water produced by the Generation 1 machines were due to the presence of molecular hydrogen gas produced at the cathode during electrolysis. This greatly increased the scientific credibility of electrolyzed alkaline water due to the support of hundreds of independent publications dating back to 2007 that proved the health benefits of molecular hydrogen gas for many disease models.

The problem with attributing all the health benefits of electrolyzed alkaline water to hydrogen gas is that most of the benefits observed historically were not from freshly electrolyzed alkaline water. Since hydrogen gas diffuses out of the water in a few hours (or days if sealed within a glass bottle), there would have been no hydrogen gas present to cause the health benefits observed. Thus, there must be some other component of electrolyzed alkaline water causing the health benefits. The logical conclusion is that the energy that is input and stored in the water by the electrolysis process must be producing the positive health results.

Despite the research that has been conducted on the effects of consuming electrolyzed water, as well as to the effects of electrolysis on the chemistry of the water itself, including the pH, ORP, dissolved oxygen ("DO"), and dissolved hydrogen ("DH"), scientific research into the dissociation activity (ionization potential, or "IP") as well as the structure (clusters, hydrogen bonds) of electrolyzed water has been lacking. With particular regard to the structure of the water, recent experiments have shown that a fourth phase of water exists that comprises "EZ zones." Such EZ zones have been shown to hold energy/electrical charge, wherein the electrical charge can be enhanced or obtained from ultraviolet ("UV") light.

The IP of electrolyzed water produced by Generation 1 machines has been measured to be approximately four times the IP of pure water. This higher IP (energy) of electrolyzed water appears to be stable for long periods of time, as the energy is stored in the water structure. Since the dissociation of water (IP) increases with temperature, the higher IP of electrolyzed alkaline water produced by Generation 1 machines at room temperature causes the water to act as if it was at a higher temperature, which explains the higher solubility of the electrolyzed water. Thus, the higher IP/solubility can be equated to higher temperature (or energy). Therefore, the higher IP of alkaline electrolyzed water produced by Generation 1 machines provides at least a partial explanation of why positive health benefits were observed when no hydrogen gas was present.

It is well established in wastewater treatment that to remove stable colloids from the water a chemical must be added to reduce the zeta potential (counter charge) around the suspended solids. Once the counter charge is reduced/removed, the colloidal particles will attract each other and coagulate and precipitate out of solution. The same principle can be applied to hydrogen (and oxygen) bubbles, but in reverse. That is, by increasing the zeta potential around the bubbles, they will be resistant to combining into micro and larger bubbles that float out of solution.

Despite having been available for a considerable amount of time, the Generation 1 machines used to produce electrolyzed alkaline water have not seen any significant technological improvements to address any of the existing concerns associated with their use. For example, the 20) high pH level associated with electrolyzed water produced by Generation 1 machines may cause adverse health effects when consumed by humans, and the acid water produced by these machines is generally useless and wasteful. Furthermore, the configuration of Generation 1 machines limits the amount of energy that can be applied to water because the membranes used in these machines produce water with a pH above 10 when the applied energy gets too high, making the water unsafe to drink, and the potable water that Generation 1 machines produce comprises a relatively low amount of hydrogen gas that only stays in the water a short period of time before dissipating.

Without a more effective means to produce consumable electrolyzed water capable of facilitating improved health benefits, most consumers are likely to miss out on the full potential of beneficial health effects consuming potable electrolyzed water may provide.

SUMMARY OF THE DISCLOSURE

What is needed are systems, methods, and apparatus for generating at least one amount of functional hydrogen water. Systems, methods, and apparatus capable of generating at least one amount of potable functional hydrogen water capable of providing one or more health benefits when consumed are also desired.

In some aspects, the present disclosure provides a functional hydrogen water generating apparatus. In some implementations, the functional hydrogen water generating apparatus may comprise at least one pre-filtration mechanism configured to remove one or more contaminants from at least one amount of water; at least one additive element applicator configured to add at least one additive element to the water to generate at least one amount of treated water; a plurality of electrodes, wherein the plurality of electrodes comprises at least one anode and at least one cathode, wherein the plurality of electrodes is configured to implement at least one electrolysis process on treated water to produce at least one amount of electrolyzed water; and at least one energy field applicator configured to apply at least one energy field to the electrolyzed water.

In some embodiments, a method for generating functional hydrogen water is disclosed. In some aspects, the method may comprise receiving at least one amount of water from at least one water source; executing at least one reverse osmosis process on the water, wherein the reverse osmosis process is configured to remove at least one contaminant from the water; adding at least one additive element to the water to generate at least one amount of treated water; implementing at least one electrolysis process on the treated water to generate at least one amount of electrolyzed water, wherein the electrolysis process may be at least partially implemented via a plurality of electrodes; and exposing the electrolyzed water to at least one energy field via at least one energy field applicator to generate at least one amount of functional hydrogen water.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

Figure 1:
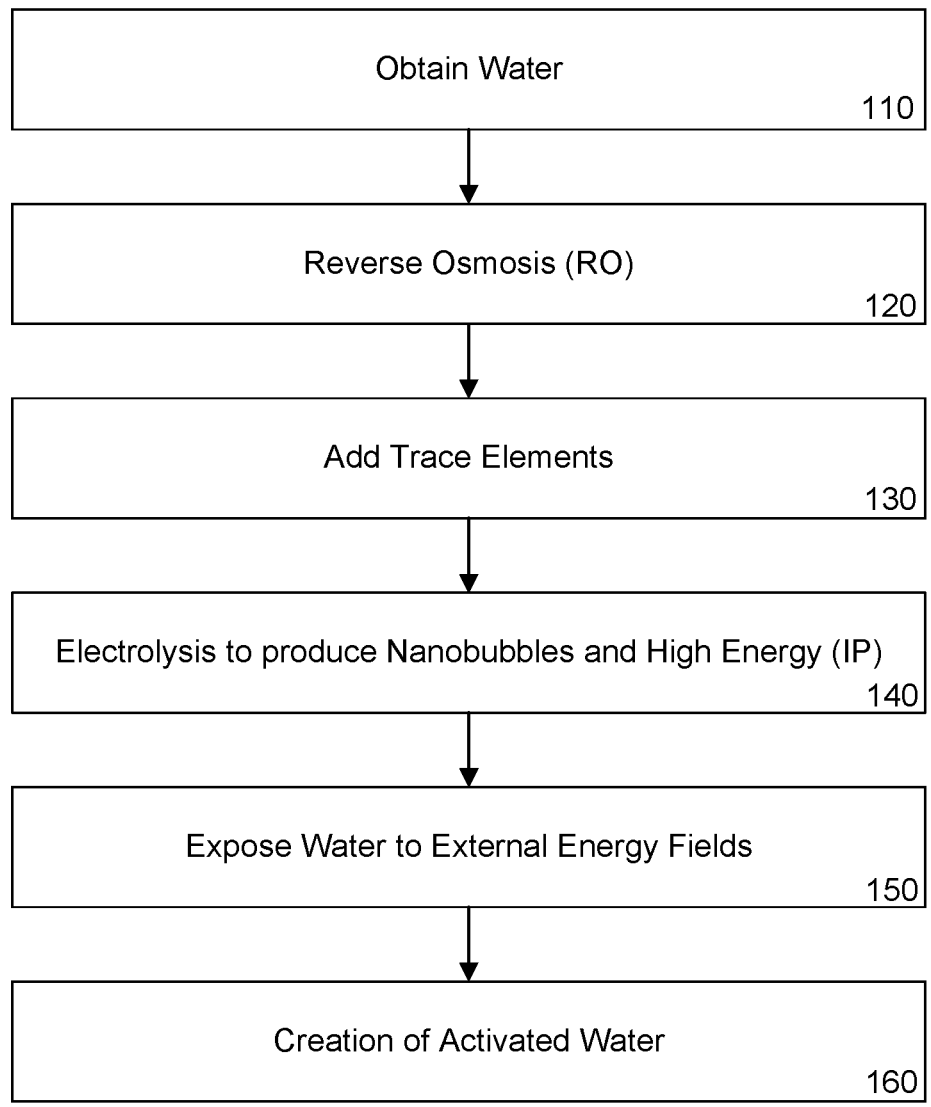
FIG. 1 illustrates method steps for an exemplary process for generating at least one amount of functional hydrogen water, according to some embodiments of the present disclosure.

The present disclosure provides generally for systems, methods, and apparatus for generating functional hydrogen water. According to the present disclosure, a process for generating functional hydrogen water may comprise obtaining an amount of water, adding at least one additive element to the obtained water to generate an amount of treated water, and applying at least one external energy field to the treated water to generate an amount of functional hydrogen water. In some aspects, the generation of functional hydrogen water may comprise the production of one or more nanobubbles, wherein the nanobubbles may increase the hydrogen and/or oxygen concentration of the functional hydrogen water for a prolonged period of time. In some implementations, the functional hydrogen water may be consumed by at least one user, wherein the increased hydrogen concentration, oxygen concentration, and/or ionization potential of the water may provide one or more health benefits to the user, such as improved hydration, relief from gastrointestinal issues, and inflammation reduction, as non-limiting examples.

In some aspects, the process for generating functional hydrogen water may be at least partially facilitated by at least one functional hydrogen water generating apparatus, wherein the functional hydrogen water generating apparatus may be configured to add at least one additive element to an amount of received water, electrolyze the water, and energize the water. In some implementations, the functional hydrogen water generating apparatus may be further configured to apply at least one reverse osmosis process to the water before the additive elements are added thereto. In some embodiments, the functional hydrogen water generating apparatus may comprise one or more of: at least one reverse osmosis mechanism, at least one additive element applicator, and at least one energy field applicator, as non-limiting examples. In some aspects, the functional hydrogen water generating apparatus may be configured to increase the lifespan of a concentration of dissolved hydrogen and/or dissolved oxygen within the functional hydrogen water generated by the apparatus, which may allow a user to benefit from consuming the functional hydrogen water even after a prolonged period of time after which the functional hydrogen water may have been generated.

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

GLOSSARY

Nanobubble: as used herein refers to a globule of a first at least one substance within a second at least one substance. By way of example and not limitation, a nanobubble may comprise a globule of hydrogen gas, a globule of oxygen gas, or a globule of any combination of hydrogen gas and oxygen gas, within at least one amount of water. In some non-limiting exemplary embodiments, a nanobubble may comprise a diameter of approximately 10 nm to 1,000 nm. As a non-limiting illustrative example, a nanobubble may comprise a diameter of approximately 100 nm.

Additive element: as used herein refers to any element, molecule, composition, or substance that may be added to at least one amount of water. In some aspects, an additive element may comprise an amount of one or more of: calcium, magnesium, potassium, silicon, or sodium, or any combination thereof, as non-limiting examples.

Treated water: as used herein refers to at least one amount of water that has been subjected to at least one filtering process and/or to which one or more additive elements may have been added.

Electrolyzed water: as used herein refers to at least one amount of water that has undergone at least one electrolysis process. In some non-limiting exemplary embodiments, an amount of treated water may be subjected to at least one electrolysis process to generate an amount of electrolyzed water.

Functional water: as used herein refers to at least one amount of water that has been exposed to at least one external energy field. By way of example and not limitation, an external energy field may comprise electromagnetic energy, ultraviolet ("UV") radiation, magnetic energy, an energy vortex, or any other form of energy to which water may be exposed, as well as any combination thereof, as non-limiting examples. In some non-limiting exemplary embodiments, an amount of treated water or an amount of electrolyzed water may be exposed to at least one external energy field to produce an amount of functional water. In some aspects, after being exposed to at least one external energy field, one or more nanobubbles within the functional water may comprise an increased lifespan. In some implementations, functional water may comprise a higher ionization potential than other water due to the presence of EZ zones within the functional water that retain electrical charge.

Energized water: as used herein refers to at least one amount of water that has undergone at least one electrolysis process and/or has been exposed to at least one external energy field.

Functional hydrogen water: as used herein refers to at least one amount of water that may provide one or more health or other functional benefits beyond those typically associated with regular water or currently available hydrogen water. In some aspects, by way of example and not limitation, functional hydrogen water may at least partially comprise at least one amount of electrolyzed water, functional water, or energized water, as well as any combination thereof.

Referring now to FIG. 1, method steps for an exemplary process 100 for generating at least one amount of functional hydrogen water, according to some embodiments of the present disclosure, are illustrated. In some implementations, process 100 may be at least partially facilitated by at least one functional hydrogen water generating apparatus and/or at least one functional hydrogen water generating system.

In some aspects, at 110, at least one amount of water may be obtained from at least one source. By way of example and not limitation, water may be obtained from a faucet, spigot, hose, bottle, container, jug, or any similar source, wherein the obtained water may have originated from a water treatment facility, spring, lake, river, well, or bottling company, as non-limiting examples. As a non-limiting illustrative example, a user may connect a functional hydrogen water generating apparatus to a sink faucet to obtain an amount of tap water therefrom to be used in process 100.

In some implementations, at 120, at least one amount of the obtained water may be subjected to at least one reverse osmosis ("RO") process, wherein the reverse osmosis process may produce at least one amount of RO water. In some embodiments, the reverse osmosis process may facilitate the removal of one or more contaminates from the water to which the reverse osmosis process may be applied. In some aspects, the contaminates may comprise one or more of: at least one bacterium, at least one mineral, or at least one chemical or compound, such as, for example and not limitation, chlorine, as non-limiting examples, or any particle, element, substance, material, or composition that may be undesirable within the obtained water, as well as any combination thereof, as non-limiting examples.

In some implementations, at 130, at least one additive element may be added to at least one amount of the produced RO water to produce at least one amount of treated water. By way of example and not limitation, an additive element may comprise an amount of one or more electrolytes, such as, for example and not limitation, one or more of: calcium, magnesium, potassium, silicon, selenium, or sodium, as non-limiting examples. In some aspects, the addition of additive elements to the RO water may enhance one or more effects that at least one electrolysis process may exert on the RO water.

In some embodiments, the addition of additive elements may enhance the conductivity of the RO water. In some aspects, one or more of the additive elements that may be added to the RO water may comprise a substance, compound, or element that may be well-suited to carry, or sustain, an electrical charge, which may facilitate an electrolysis process that may applied to the RO water. In some non-limiting exemplary implementations, one or more additive elements may be selected to be added to the RO water with the intent to enhance the taste of the water without a detracting from any potentially beneficial properties of the water.

In some aspects, at 140, at least one amount of the produced treated water may be subjected to at least one electrolysis process to produce at least one amount of electrolyzed water. In some implementations, the electrolysis process may be at least partially facilitated by at least one electrode. In some embodiments, the electrolysis process may be at least partially facilitated by a plurality of electrodes, wherein the plurality of electrodes may comprise at least one anode and at least one cathode. In some aspects, the electrode(s) may be configured to implement the electrolysis process on the treated water.

In some implementations, each electrode may comprise at least one metallic element or material, such as titanium, which may be suitable for generating potable functional hydrogen water, or copper, zinc, nickel, iron, tin, or aluminum, which may be acceptable in other applications of the generation of functional hydrogen water, such as in energy production, as non-limiting examples. In some embodiments, at least one portion of an exterior surface of each electrode may be at least partially coated or covered by at least one external material. By way of example and not limitation, the external material may at least partially comprise an amount of platinum or one or more rare earth elements, such as, for example and not limitation, iridium. In some aspects, an electrode coated with platinum may be suitable during the generation of potable functional hydrogen water, while electrodes coated with other metals may be used during the generation of functional hydrogen water for other purposes or uses.

In some aspects, at least one portion of one or more of the electrodes used to at least partially implement the electrolysis process upon the treated water may comprise a substantially flat or solid planar structure, a curved or cylindrical structure, or at least one porous, interwoven, or interlaced structure, such as a two-dimensional or three-dimensional mesh configuration, as a non-limiting examples. In some embodiments, each electrode may comprise a thickness ranging from approximately 0.1 millimeter to approximately 2.0 millimeters, or from approximately 0.5 millimeter to approximately 1.5 millimeters. In some implementations, a mesh electrode may comprise a plurality of indentations, holes, or openings, or a plurality of interwoven or interlaced wire segments. In some embodiments, by way of example and not limitation, consecutive adjacent vertical and horizontal wire segments within a mesh configuration of the electrode may be separated by a distance of approximately 10 nm to 1,000 nm. As a non-limiting illustrative example, consecutive adjacent wire segments of a mesh electrode may be spaced approximately 100 nm apart.

In some aspects, adjacent electrodes, such as a cathode and an anode, may be spaced apart by a distance of approximately 0.5 to 10 millimeters, or approximately 1 to 5 millimeters. In some implementations, one or more materials may be configured between adjacent electrodes to form a membrane system, wherein the materials may comprise, for example and not limitation, an amount of Nafion™ and/or an amount of Gore-Tex®, as non-limiting examples. In some embodiments, an electrolysis current applied to the water via the electrodes may be approximately 1 to 20 A/L, or approximately 1 to 10 A/L for a water flow rate of approximately 1-2 liters/minute. In some aspects, the polarities of adjacent electrodes may be switched at one or more predetermined time intervals. By way of example and not limitation, the polarities of the electrodes may be switched approximately five times per hour.

In some non-limiting exemplary implementations, at least one portion of the exterior surface of each electrode may be at least partially coated or covered by at least one external material. In some embodiments, the external material may comprise at least one polymer. As a non-limiting illustrative example, the external material may at least partially comprise an amount of polytetrafluoroethylene. In some aspects, the external material of the electrode may be configured or selected to decrease the wettability of at least one portion of the electrode surface at the electrode-bubble interface, thereby reducing the amount of time each nanobubble generated by the electrolysis process remains upon the surface of the electrode, which may ultimately reduce the size of each generated nanobubble.

In some embodiments, the indentations, holes, or openings of a mesh electrode structure may facilitate the production of a plurality of nanobubbles within the treated water by providing an interface between an electric current and the treated water that comprises a surface area configured with a size and structure to generate the desired nanobubbles. In some embodiments, each nanobubble generated within the treated water may comprise an amount of at least one gaseous element. By way of example and not limitation, one or more of the generated nanobubbles may comprise a globule of hydrogen, oxygen, nitrogen, carbon dioxide, or any combination thereof, as non-limiting examples.

In some aspects, each of the generated nanobubbles may comprise a size of approximately 10 nm to 1,000 nm in diameter. In some non-limiting exemplary embodiments, each nanobubble may comprise a diameter of approximately 100 nm. In some implementations, the size of each nanobubble may have an inverse correlation to the lifespan of the nanobubble, wherein the stability and lifespan of the nanobubble may increase as the size of the nanobubble decreases. In some aspects, a nanobubble that comprises a diameter of approximately 100 nm or less may be less likely to conglomerate with other nanobubbles and/or other gases within the treated water.

In some embodiments, this decreased tendency to conglomerate may cause nanobubbles with a diameter of approximately 100 nm or less to have a longer lifespan than larger bubbles, as larger bubbles may be more likely to experience conglomeration to grow even larger, which may cause the bubbles to float to the surface of the water, burst, and dissipate. By way of example and not limitation, microbubbles comprising a diameter greater than or equal to approximately 5,000 nm may have a particularly high tendency to absorb other gases, expand, float to the water surface, and burst.

In some implementations, each nanobubble generated within the treated water may comprise a zeta potential that may inhibit conglomeration of the nanobubbles, thereby increasing the stability, as well as the lifespan, of each generated nanobubble. In some aspects, the zeta potential of each nanobubble may comprise an electrostatic surface potential of the nanobubble. In some embodiments, by way of example and not limitation, the electrostatic surface potential of each generated nanobubble may be approximately 0 mV to −100 mV. In some implementations, the zeta potential of the nanobubbles within the treated water may cause the nanobubbles to repel each other, thereby reducing the ability or tendency of the nanobubbles to conglomerate, which may delay the eventual floating, bursting, and dissipating of the nanobubbles, causing the nanobubbles to have a prolonged lifespan.

In some aspects, at 150, at least one amount of the generated electrolyzed water may be exposed to at least one external energy field using at least one energy field applicator. In some implementations, the external energy field may comprise electromagnetic energy, ultraviolet radiation, magnetic energy, an energy vortex, or any other form of energy to which water may be exposed, as well as any combination thereof, as non-limiting examples. In some embodiments, the energy field applicator may comprise one or more of: a light source (such as, for example and not limitation, an ultraviolet light source), a magnet, an electromagnet, and/or a power source, as non-limiting examples.

In some aspects, at 160, at least one amount of functional hydrogen water may be generated after the electrolyzed water has been exposed to at least one external energy field. In some embodiments, exposing the electrolyzed water to at least one external energy field may facilitate the addition of energy to the exclusion zones around the nanobubbles, as well as one or more of the additive elements. In some implementations, this added energy may increase the electrostatic surface potential of the nanobubbles, which may strengthen the repelling force between the nanobubbles, thereby causing the nanobubbles to be more stable and to be less likely to conglomerate, which may ultimately increase the lifespan of the nanobubbles. In some aspects, the generated functional hydrogen water may provide one or more health benefits to a consumer thereof, such as enhanced hydration, reduced inflammation, or relief from gastrointestinal issues, as non-limiting examples, wherein the health benefits may be at least partially facilitated by the concentration of dissolved hydrogen gas and/or oxygen gas within the nanobubbles within the functional hydrogen water, as well as an increased ionization potential of the functional hydrogen water. By way of example and not limitation, the functional hydrogen water may comprise a concentration of dissolved hydrogen gas that exceeds 1 ppm, or from approximately 0.5 ppm to approximately 1.6 ppm, a concentration of dissolved oxygen gas greater than 10 ppm, or from approximately 7 ppm to 18 ppm, and an ionization potential approximately 3 to 10 times the ionization potential of the original source water.

Figure 2:
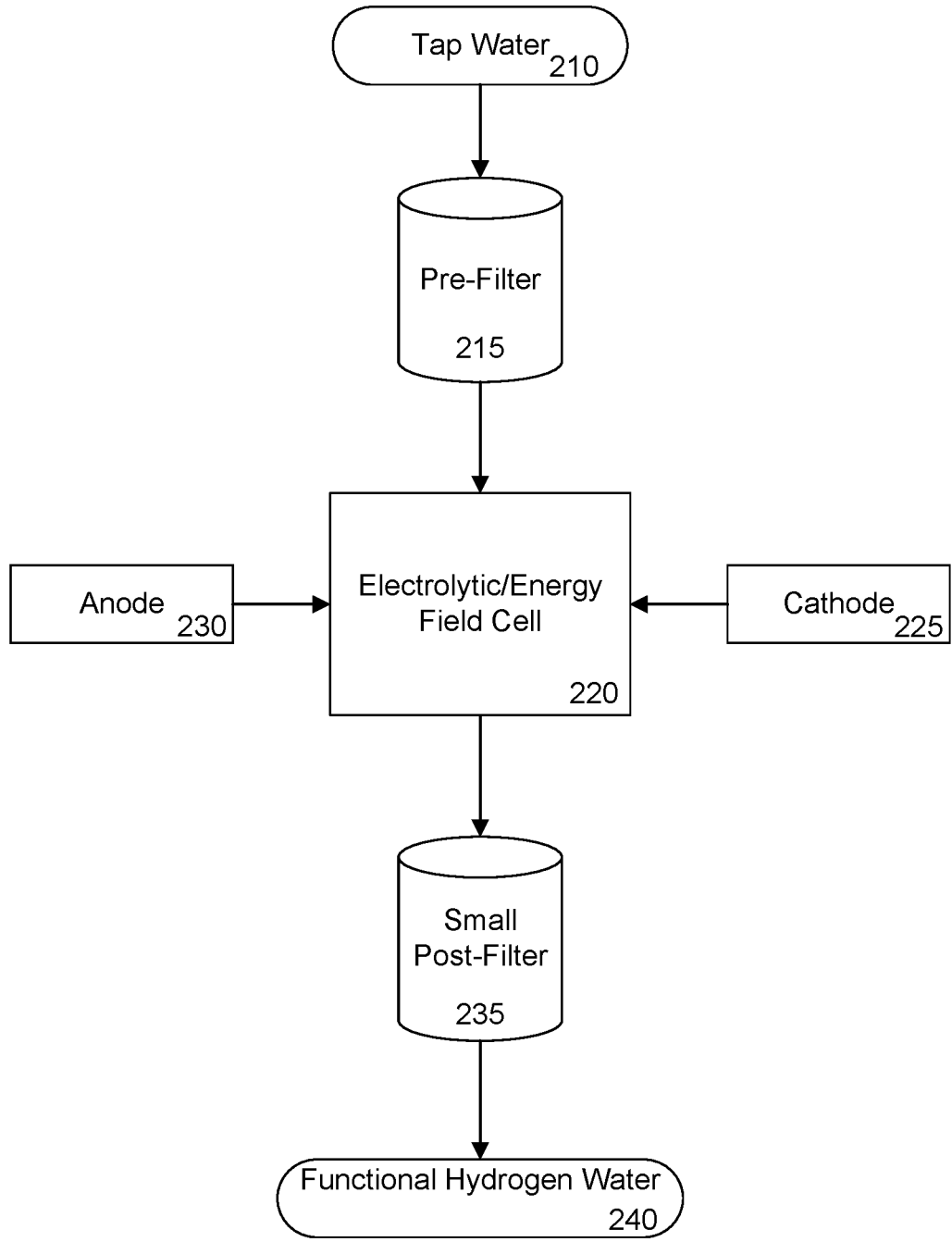
FIG. 2 illustrates a flowchart of an exemplary process for generating functional hydrogen water, according to some embodiments of the present disclosure.

Referring now to FIG. 2, a flowchart of an exemplary process 200 for generating functional hydrogen water 240, according to some embodiments of the present disclosure, is illustrated. In some aspects, process 200 may comprise obtaining or otherwise receiving an amount of water from at least one source. By way of example and not limitation, the received water may comprise an amount of tap water 210, or water obtained from any faucet, spigot, hose, bottle, container, jug, or any similar source, wherein the obtained water may have originated from a water treatment facility, spring, lake, river, well, or bottling company, as non-limiting examples, as non-limiting examples. In some aspects, the water may be at least temporarily stored in at least one reservoir, wherein the reservoir may comprise at least one receptacle that may be configured to store at least one amount of the water.

In some embodiments, at least one portion of the received and/or stored water may be subjected to at least one pre-filtering process by being directed through at least one pre-filtration mechanism 215. In some aspects, the pre-filtration mechanism 215 may comprise at least one filtering material, such as a semipermeable membrane, an amount of polyester, one or more metals, an amount of filter aggregate (such as, for example and not limitation, sand, gravel, or crushed rock), an amount of charcoal, one or more lights (such as, for example and not limitation, one or more ultraviolet lights), or an amount of calcite, as non-limiting examples, or any material that may remove at least a portion of one or more contaminates from at least one amount of water, as well as any combination thereof.

As a non-limiting illustrative example, in some aspects the pre-filtration mechanism 215 may comprise at least one semipermeable membrane configured to implement a reverse osmosis process on water that may be directed therethrough. In some embodiments, the pre-filtration mechanism 215 may be configured to add one or more additive elements to the water to produce at least one amount of treated water, wherein the pre-filtration mechanism 215 may comprise at least one additive element applicator configured to expose at least one additive element source to the water as the water flows through or by at least one portion of the pre-filtration mechanism 215 such that the water may comprise an amount of the associated additive element after being exposed to the additive element source. By way of example and not limitation, the additive element(s) added to the water may comprise a concentration of approximately 20 to 100 ppm or approximately 35 to 50 ppm, wherein the pH of the water after receiving the additive elements may range from approximately 7 to 9 or from approximately 7.5 to 8.5. In some non-limiting exemplary implementations, the additive element applicator may comprise a portion of or may be physically connected to the pre-filtration mechanism 215, or the additive element applicator may be physically separate from the pre-filtration mechanism 215.

In some embodiments, the additive element(s) added to form the treated water may be selected to facilitate or enhance at least one electrolysis process that may be exerted on the treated water by increasing the conductivity of the treated water. In some implementations, one or more of the additive elements may be added to the treated water to increase the pH level, maximize energy retention, improve the taste, enhance the hydration capabilities, and/or influence the structure of the treated water, as non-limiting examples.

In some aspects, the treated water may be subjected to at least one energizing device 220, wherein the energizing device 220 may comprise at least one electrolyzer cell and at least one energy field applicator. In some implementations, the electrolyzer cell may comprise at least one electrode. In some embodiments, the electrolyzer cell may comprise a plurality of electrodes, wherein the plurality of electrodes may comprise at least one anode 230 and at least one cathode 225, wherein exposing the treated water to the anode 230 and the cathode 225 and applying a voltage between the anode 230 and the cathode 225 may exert an electrolysis process on the treated water to generate at least one amount of electrolyzed water.

In some aspects, the electrolyzed water may be exposed to at least one external energy field provided by at least one energy field applicator to generate at least one amount of functional hydrogen water 240. In some implementations, the external energy field may comprise electromagnetic energy, ultraviolet radiation, magnetic energy, an energy vortex, or any other form of energy to which water may be exposed, as well as any combination thereof, as non-limiting examples. In some non-limiting exemplary embodiments, the functional hydrogen water 240 may be directed through at least one post-filtration mechanism 235, wherein the post-filtration mechanism 235 may be configured facilitate the removal of one or more contaminants, such as, for example and not limitation, an amount of free chorine, from the functional hydrogen water 240 and/or one or more of the additive elements that were previously added during generation of the treated water and that may not be necessary after completion of the electrolysis process and exposure to the external energy field. In some implementations, the post-filtration mechanism 235 may be configured to remove one or more contaminants and/or additive elements that may negatively affect the taste of the functional hydrogen water 240. In some embodiments, by way of example and not limitation, the post-filtration mechanism 235 may comprise a carbon-polishing filter or other type of carbon filter. In some aspects, the functional hydrogen water 240 may provide one or more health benefits to a user when consumed.

Figure 3:
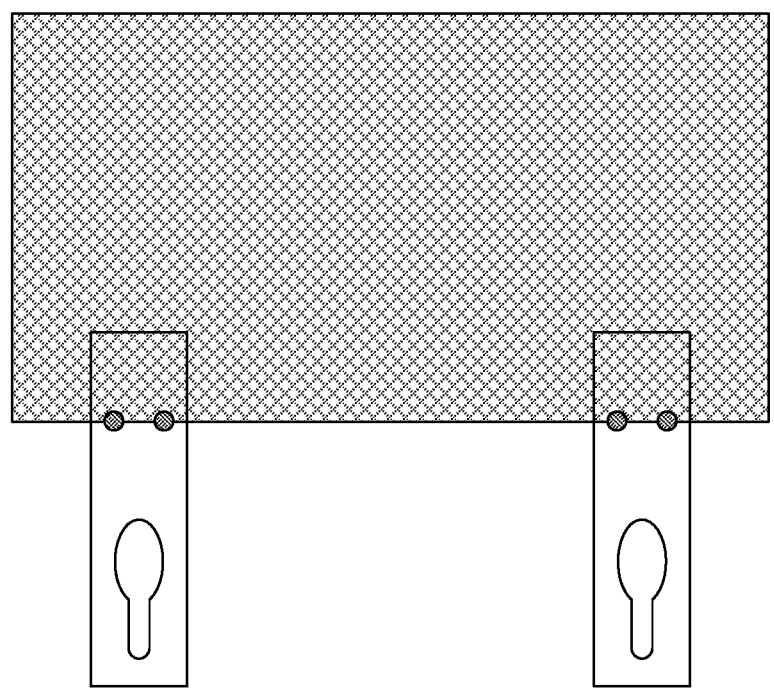
FIG. 3 illustrates an exemplary electrode for generating functional hydrogen water, according to some embodiments of the present disclosure.

Referring now to FIG. 3, an exemplary electrode 300 for generating functional hydrogen water, according to some embodiments of the present disclosure, is illustrated. In some aspects, at least one amount of treated water may be subjected to at least one electrolysis process that may be at least partially implemented via at least one electrode 300. In some embodiments, the electrolysis process exerted on the treated water may be facilitated by a plurality of electrodes 300, wherein at least one of the electrodes 300 may comprise an anode and at least one of the electrodes 300 may comprise a cathode. In some aspects, the electrodes 300 may be configured to execute the electrolysis process on the treated water when a voltage is applied between the anode and the cathode from at least one power source, which may cause the at least temporary passage of at least one electric current through at least one portion of the treated water that may be in direct or indirect physical contact with at least one of the electrodes 300.

In some implementations, an electrode 300 that comprises a cathode may comprise a negative charge that may facilitate a reduction reaction within the treated water, wherein electrons from the cathode may be given to hydrogen cations within the treated water to form hydrogen gas. In some aspects, an electrode 300 that comprises an anode may comprise a positive charge that may facilitate an oxidation reaction within the treated water, wherein water molecules may give electrons to the anode, resulting in the liberation of oxygen gas. In some embodiments, these hydrogen and oxygen gas molecules may quickly agglomerate to form nanobubbles of hydrogen and oxygen.

In some aspects, each electrode 300 may comprise at least one metal or combination of metals, such as titanium, which may be suitable in generating potable functional hydrogen water, or copper, zinc, nickel, iron, tin, or aluminum, which may be acceptable for other applications of the generation of functional hydrogen water, as non-limiting examples. In some aspects, at least one portion of the electrode 300 may comprise a substantially flat or solid planar structure, at least one portion of the electrode 300 may comprise a curved or cylindrical structure, or at least one portion of the electrode 300 may comprise at least one textured, notched, porous, interwoven, or interlaced structure, such as a two-dimensional or three-dimensional mesh configuration, which may be curved or planar, as non-limiting examples. In some implementations, a mesh structure of the electrode 300 may comprise a plurality of interwoven or interlaced wire segments. In some embodiments, by way of example and not limitation, consecutive adjacent vertical and horizontal wire segments within a mesh configuration of the electrode 300 may be separated by a distance of approximately 10 nm to 1,000 nm. As a non-limiting illustrative example, consecutive adjacent wire segments of the mesh electrode may be spaced approximately 100 nm apart.

In some implementations, at least one portion of the exterior surface of each electrode 300 may be at least partially coated or covered by at least one external material. By way of example and not limitation, the at least one external material may at least partially comprise an amount of platinum or one or more rare earth elements, such as, for example and not limitation, iridium. In some aspects, an electrode coated with platinum may be suitable during the generation of potable functional hydrogen water, while electrodes coated with other metals may be used during the generation of functional hydrogen water for other purposes or uses. In some embodiments, the external material may comprise at least one polymer. As a non-limiting illustrative example, the external material may at least partially comprise an amount of polytetrafluoroethylene. In some aspects, the external material of the electrode 300 may be configured or selected to decrease the wettability of at least one portion of the exterior surface of the electrode 300 at the electrode-bubble interface, thereby reducing the amount of time each nanobubble generated by an electrolysis process remains upon the surface of the electrode 300, which may ultimately reduce the size of each generated nanobubble.

In some embodiments, the porous nature of a mesh electrode 300 structure may facilitate the production of a plurality of nanobubbles within the treated water by providing an interface between an electric current and the treated water that comprises a surface area configured with a size and structure to generate the desired nanobubbles. In some embodiments, each nanobubble generated within the treated water may comprise an amount of at least one gaseous element. By way of example and not limitation, one or more of the generated nanobubbles may comprise a globule of hydrogen, oxygen, nitrogen, carbon dioxide, or any combination thereof, as non-limiting examples.

In some implementations, the structure or configuration of the electrode 300 may be designed or selected to optimize nanobubble production. By way of example and not limitation, each electrode 300 that may be used in a system or method for generating functional hydrogen water may comprise one or more of: a flat or planar structure, such as a solid plate; a two-dimensional or three-dimensional mesh structure; one or more gels or hydrogels; or one or more cylinders or tubes. In some non-limiting exemplary embodiments, a plurality of electrodes 300 may comprise an anode-cathode pairing that may comprise a plurality of cylinders, wherein a first cylinder may be configured within the open hollow portion of a second, larger cylinder.

Figure 4:
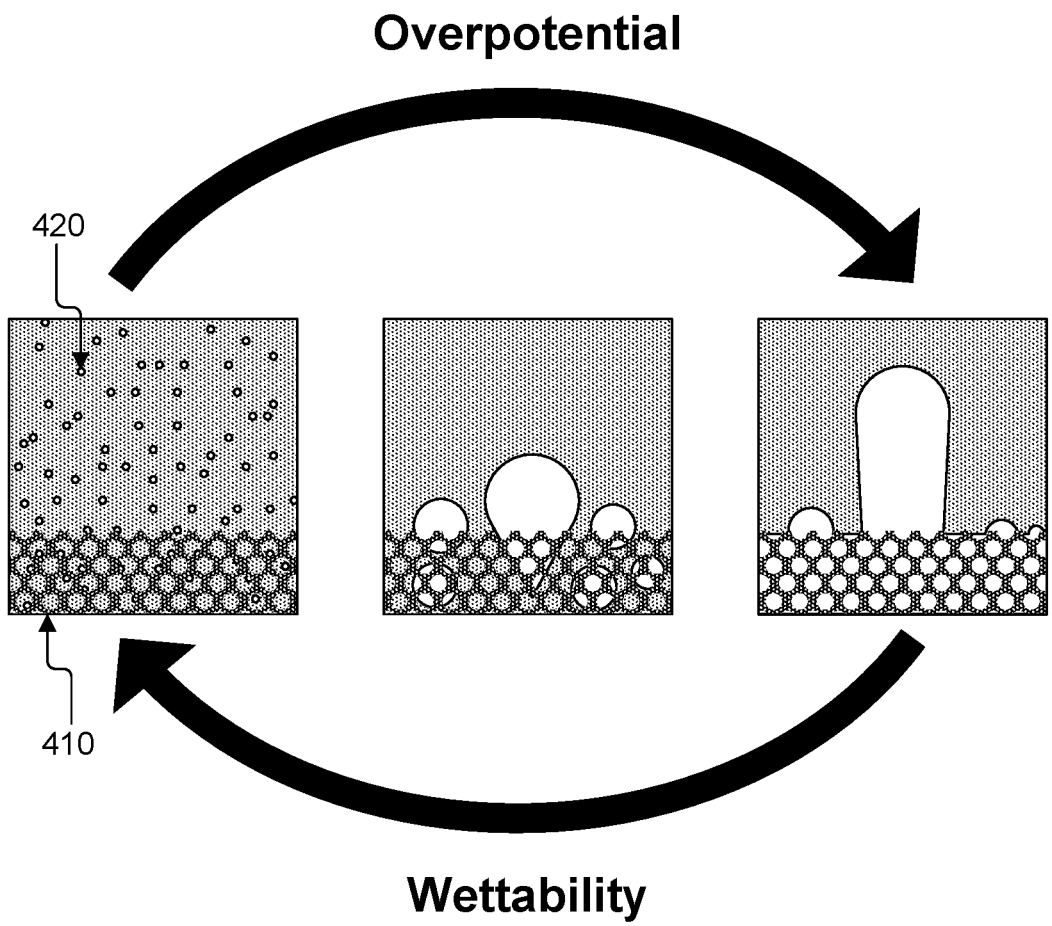
FIG. 4 illustrates a flowchart depicting an exemplary correlation between bubble size and electrode wettability, according to some embodiments of the present disclosure.

Referring now to FIG. 4, a flowchart 400 depicting an exemplary correlation between bubble size and electrode wettability, according to some embodiments of the present disclosure, is illustrated. In some aspects, at least one amount of treated water may be subjected to at least one electrolysis process that may be implemented via at least one electrode 410. In some embodiments, the electrolysis process may be facilitated by a plurality of electrodes 410, wherein at least one of the electrodes 410 may comprise an anode and at least one of the electrodes 410 may comprise a cathode. In some aspects, the electrodes 410 may be configured to facilitate at least one electrolysis process on the treated water by enabling the at least temporary passage of at least one electrical current through at least one portion of the water. In some implementations, the electrical current may facilitate the formation of hydrogen and oxygen gas molecules within the treated water, wherein the gas molecules may agglomerate to become one or more nanobubbles 420 of hydrogen or oxygen, or a combination thereof. In some aspects, each electrode 410 may comprise at least one metal or combination of metals, such as titanium, which may be suitable for generating potable functional hydrogen water, or copper, zinc, nickel, iron, tin, or aluminum, which may be acceptable in other applications of the generation of functional hydrogen water, as non-limiting examples.

In some implementations, at least one portion of one or more of the electrodes 410 may comprise a substantially flat or solid planar structure, at least one portion of one or more of the electrodes 410 may comprise a curved or cylindrical structure, or at least one portion of one or more of the electrodes may comprise a textured, notched, porous, interwoven, or interlaced structure, such as a two-dimensional or three-dimensional mesh configuration, as non-limiting examples. In some implementations, at least one portion of the exterior surface of each electrode 410 may be at least partially coated or covered by at least one external material, such as, for example and not limitation, an amount of platinum or an amount of one or more rare earth elements, such as, for example and not limitation, iridium. In some aspects, an electrode 410 coated with platinum may be suitable during the generation of potable functional hydrogen water, while electrodes 410 coated with other metals may be used during the generation of functional hydrogen water for other purposes or uses. In some embodiments, the external material may comprise at least one polymer. As a non-limiting illustrative example, the external material may at least partially comprise an amount of polytetrafluoroethylene. In some aspects, the external material of the electrode 410 may be configured or selected to decrease the wettability of at least one portion of the exterior surface of the electrode 410 at the electrode-bubble interface, thereby reducing the amount of time each bubble generated by an electrolysis process remains upon the surface of the electrode 410, which may ultimately reduce the size of each generated bubble.

In some embodiments, as the wettability at the surface of the electrode 410 increases, bubbles may remain attached to the electrode 410 surface for longer periods of time during formation, which may cause the size of the bubbles to increase. In some aspects, by remaining on the surface of the electrode 410 for prolonged periods of time, the bubbles generated by electrolysis may start to experience a wicking effect and may comprise an increasing amount of gas.

Figure 5:
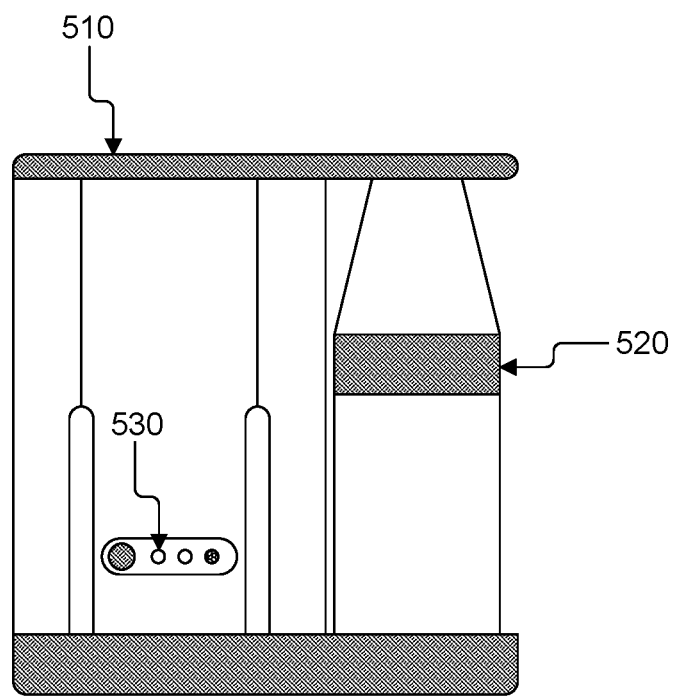
FIG. 5 illustrates an exemplary functional hydrogen water generating apparatus, according to some embodiments of the present disclosure.

Referring now to FIG. 5, an exemplary functional hydrogen water generating apparatus 500, according to some embodiments of the present disclosure, is illustrated. In some aspects, the functional hydrogen water generating apparatus 500 may comprise at least one housing 510. In some embodiments, the housing 510 may comprise at least one internal storage reservoir and at least one intake opening, wherein the intake opening may be configured to receive at least one amount of water from at least one external water source such that the received water may be at least temporarily stored within the internal storage reservoir. By way of example and not limitation, the external water source may comprise a faucet, spigot, hose, bottle, container, jug, or any similar source, wherein the water obtained therefrom may have originated from a water treatment facility, spring, lake, river, well, or bottling company, as non-limiting examples.

In some aspects, the internal storage reservoir may be configured to allow the water therein to be processed by the functional hydrogen water generating apparatus 500. In some implementations, the functional hydrogen water generating apparatus 500 may provide a convenient way for a user to generate functional hydrogen water from water obtained from nearly any source. In some aspects, the housing 510 may comprise at least one output aperture, wherein the output aperture may allow at least one amount of functional hydrogen water to be removed from the functional hydrogen water generating apparatus 500 after the functional hydrogen water has been generated by the functional hydrogen water generating apparatus 500. In some non-limiting exemplary embodiments, the output aperture may be configured at a position and with an orientation to discharge at least one portion of the generated functional water into at least one receptacle 520, such as a carafe, jug, bottle, cup, mug, pot, kettle, or similar container, as non-limiting examples.

In some embodiments, the functional hydrogen water generating apparatus 500 may comprise at least one activation mechanism 530. In some implementations, the activation mechanism may be configured to activate at least one power source within or in electrical communication with the functional hydrogen water generating apparatus 500 upon being manipulated by at least one user. By way of example and not limitation, the activation mechanism 530 may comprise one or more of: a button, switch, knob, sliding mechanism, or touchscreen, as non-limiting examples, that may be configured to be manipulated by or to receive at least one input from at least one user.

In some aspects, the activation mechanism 530 may be communicatively coupled to at least one indicator device that may be configured to display at least one status of the functional hydrogen water generating apparatus 500. By way of example and not limitation, the indicator device may be configured to indicate whether the functional hydrogen water generating apparatus 500 is powered on, is actively generating functional hydrogen water, comprises an amount of water within the internal storage reservoir, or may need maintenance work, as non-limiting examples. By way of further example and not limitation, the indicator device may comprise one or more of: as at least one light source, one or more colored light sources, at least one display screen, or at least one audio emitting device, as non-limiting examples. By way of still further example and not limitation, the power source within or electrically coupled to the functional hydrogen water generating apparatus 500 may comprise one or more of: at least one battery, at least one rechargeable battery, an amount of alternating electrical current from an external energy source, an amount of direct electrical current from an external energy source, or at least one photovoltaic cell, as non-limiting examples.

In some implementations, an internal portion of the functional hydrogen water generating apparatus 500 may comprise at least one electrode. In some embodiments, each electrode may be configured to be at least partially and at least temporarily immersed within an amount of water that may be pumped from the internal storage reservoir. In some aspects, the functional hydrogen water generating apparatus 500 may comprise a plurality of electrodes that may be configured to implement at least one electrolysis process on the water pumped from the internal storage reservoir. In some embodiments, the plurality of electrodes may comprise at least one anode and at least one cathode. In some aspects, the electrodes may be configured to implement the electrolysis process on the water by facilitating the at least temporary passage of electricity through at least one portion of the water pumped from the internal reservoir. In some embodiments, at least one portion of each electrode may be at least partially covered or coated with at least one external material. As a non-limiting illustrative example, in some aspects the external material may at least partially comprise an amount of platinum or an amount of one or more rare earth elements, such as, for example and not limitation, iridium. In some aspects, an electrode coated with platinum may be suitable during the generation of potable functional hydrogen water, while electrodes coated with other metals may be used during the generation functional hydrogen water for other purposes or uses.

In some implementations, the functional hydrogen water generating apparatus 500 may comprise at least one reverse osmosis mechanism. In some aspects, the reverse osmosis mechanism may comprise at least one semipermeable membrane. By way of example and not limitation, the semipermeable membrane may comprise one or more of: an amount of cellulose acetate, an amount of cellophane, or an amount of one or more polyamide resins, as non-limiting examples, as well as any combination thereof. In some embodiments, the reverse osmosis mechanism may comprise at least one pressurizing mechanism, wherein the at least one pressurizing mechanism may facilitate the movement of water through the semipermeable membrane, wherein the semipermeable membrane may filter one or more contaminants out of the water as the water moves through. By way of example and not limitation, the pressurizing mechanism may be configured to generate an amount of one or more of: air pressure, vapor pressure, or electrically induced pressure, as non-limiting examples, as well as any combination thereof, such that the pressurizing mechanism may function as a water pump. In some implementations, the removal of contaminants may be beneficial to prepare the water for the electrolysis process, as the electrolysis process may cause one or more negative properties associated with the contaminants to become amplified.

In some aspects, the functional hydrogen water generating apparatus 500 may comprise at least one additive element applicator. In some embodiments, the additive element applicator may be configured to apply, integrate, or otherwise add at least one additive element to the water within the internal storage reservoir of the functional hydrogen water generating apparatus 500. By way of example and not limitation, the additive element applicator may comprise one or more of: a filter, an injection mechanism, or a receiver for manual addition of 20) additive elements, as non-limiting examples. In some implementations, the additive element applicator may be activated or engaged after at least an amount of water from the internal storage reservoir has undergone reverse osmosis, wherein the activation may be initiated in an at least partially autonomous manner when at least one controller communicatively coupled to the additive element applicator receives at least one prompt or similar signal transmitted from at least one sensor, timer, or other mechanism that may indicate that the reverse osmosis mechanism has completed a filtration process on the water. In some aspects, the addition of one or more additive elements may facilitate the electrolysis of the water by enhancing the conductivity of the water, wherein at least a portion of the additive elements may comprise a substance, element, material, composition, or compound that may carry, or sustain, an electrical charge. In some implementations, one or more additive elements may be selectively added to the water to enhance the taste of the water without affecting the other potentially beneficial properties that may be associated with consuming the water, such as reduced inflammation, enhanced hydration, or reduced gastrointestinal issues, as non-limiting examples.

In some aspects, the functional hydrogen water generating apparatus 500 may comprise at least one energy field applicator. In some embodiments, the energy field applicator may be configured to expose at least one amount of water within one or more portions of the functional hydrogen water generating apparatus 500 to at least one energy field after the water has been subjected to at least one reverse osmosis or similar filtration process and has received the addition of one or additive elements. In some aspects, the energy field applicator may comprise one or more of: a light source, an ultraviolet light source, a magnet, an electromagnet, or a power source, as non-limiting examples, as well as any combination thereof. In some implementations, the energy field supplied by the energy field applicator may comprise one or more of: electromagnetic energy, ultraviolet radiation, magnetic energy, an energy vortex, or any other type of energy to which water may be exposed, as well as any combination thereof, as non-limiting examples.

In some aspects, exposing the water to at least one energy field may facilitate the production of functional hydrogen water. In some embodiments, exposing water to the energy field may facilitate the addition or increase of energy around one or more nanobubbles generated by the electrolysis process and/or one or more of the additive elements therein. In some implementations, increasing the energy of the nanobubbles may also increase the zeta potential of the nanobubbles, which may cause the nanobubbles to repel each other with a greater amount of force, which may cause the nanobubbles to be more stable and have a prolonged lifespan. In some aspects, the increased lifespan of the nanobubbles may allow one or more health benefits associated with consuming the functional water to be realized for a longer period of time.

In some implementations, the functional hydrogen water generating apparatus 500 may not comprise an internal reservoir. In such implementations, the reverse osmosis process, the electrolysis process, and the exposure to the energy field may be implemented on received water as it flows into, through, and out of the functional water generating apparatus 500 in an on-demand fashion.

Figure 6:
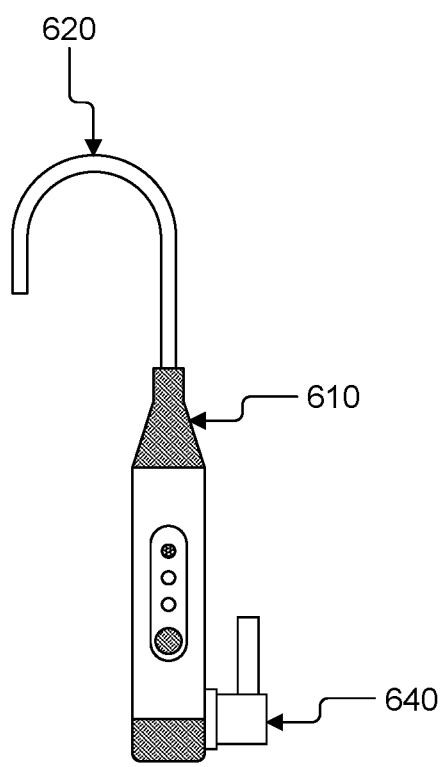
FIG. 6 illustrates an exemplary dispenser for a functional hydrogen water generating apparatus, according to some embodiments of the present disclosure.

Referring now to FIG. 6, an exemplary dispenser 600 for a functional hydrogen water generating apparatus, according to some embodiments of the present disclosure, is illustrated. In some aspects, the dispenser 600 may comprise at least one housing 610. In some embodiments, the housing 610 may comprise at least one activation mechanism 640, wherein the activation mechanism 640 may be configured to alter at least one valve between an open position and a closed position, wherein the valve may be configured to control the flow of source water prior to being exposed to reverse osmosis or electrolysis. In some aspects, configuring the valve in an at least partially open position may allow water to flow from at least one spout 620 or similar structure that comprises at least one opening through which water may exit the dispenser 600, wherein water exiting the dispenser 600 may comprise functional hydrogen water generated by at least one functional hydrogen water generating apparatus. In some implementations, the functional hydrogen water generating apparatus may implement one or more of: a reverse osmosis process, the addition of one or more additive elements, an electrolysis process, or the application of at least one energy field to generate the functional hydrogen water discharged from the dispenser 600, as non-limiting examples.

Figure 7A:
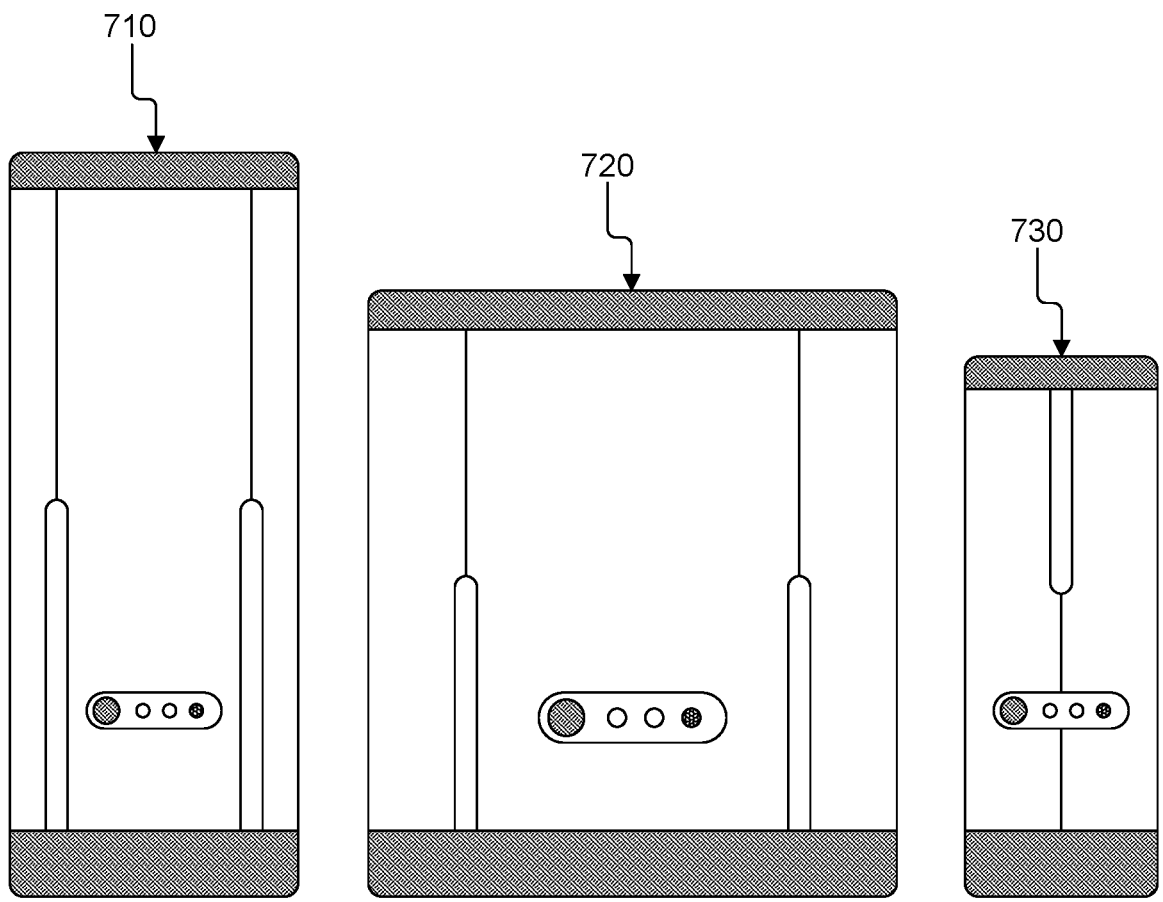
FIG. 7A illustrates a plurality of exemplary functional hydrogen water generating apparatus, according to some embodiments of the present disclosure.
Figure 7B:
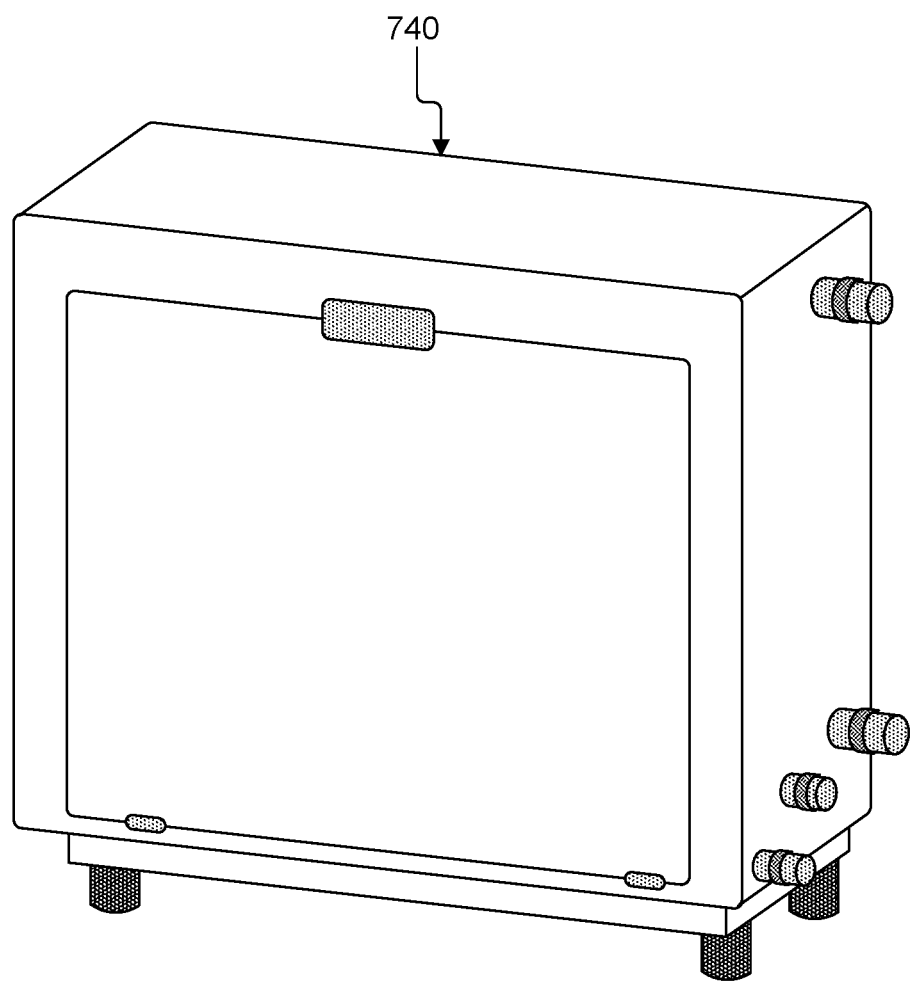
FIG. 7B illustrates an exemplary functional hydrogen water generating apparatus, according to some embodiments of the present disclosure.

Referring now to FIGS. 7A and 7B, a plurality of exemplary functional hydrogen water generating apparatus 700, according to some embodiments of the present disclosure, are illustrated. In some aspects, a functional hydrogen water generating apparatus 700 may comprise one or more of a variety of potential shapes, sizes, dimensions, or configurations. In some implementations, a configuration of a functional hydrogen water generating apparatus 700 may be selected based at least partially on the intended location of the functional water generating apparatus 700. In some non-limiting exemplary embodiments, the functional hydrogen water generating apparatus 700 may comprise a housing 710, 730 configured to be used in a compact space, such as, for example and not limitation, under a kitchen or bathroom sink or on a countertop, wherein the housing 710, 730 may comprise, for further example and not limitation, a narrow width and a taller height.

In some embodiments, the functional hydrogen water generating apparatus 700 may comprise a housing 720 that may comprise a larger size configuration that may be suitable to use the functional water generating apparatus 700 on a large countertop, table, shelf, or similar surface.

In some aspects, the functional hydrogen water generating apparatus 700 may comprise a large housing 740, such that the functional hydrogen water generating apparatus 700 may be connected to or integrated with the water system of a residence, commercial, or industrial building, or any water treatment system that may supply water to a plurality of users or to one or more users at a plurality of discharge locations and devices.

Figure 8:
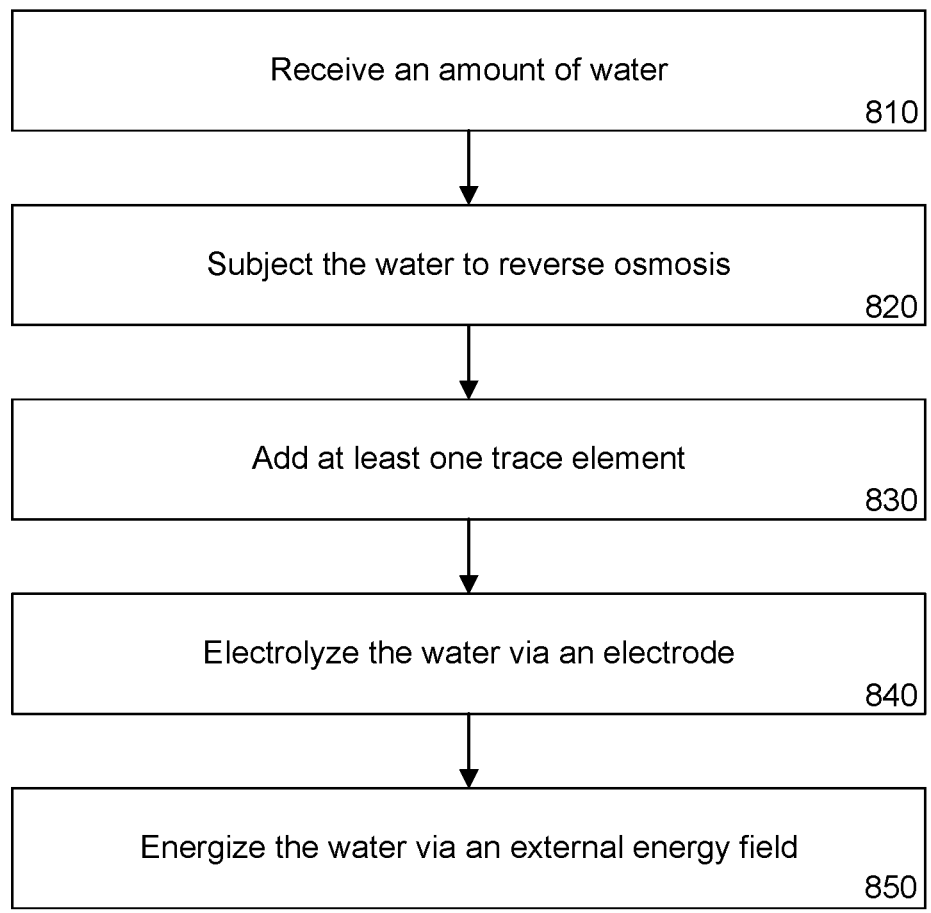
FIG. 8 illustrates method steps for an exemplary process for generating functional hydrogen water, according to some embodiments of the present disclosure.

Referring now to FIG. 8, method steps for an exemplary process 800 for generating functional hydrogen water, according to some embodiments of the present disclosure, are illustrated. In some aspects, at 810, at least one amount of water may be obtained or otherwise received from at least one water source. In some implementations, at 820, the received water may be subjected to at least one reverse osmosis process that may be executed on the water, wherein the reverse osmosis process may facilitate the removal of one or more contaminants from the water. In some embodiments, at 830, one or more additive elements may be added to the water by at least one additive element applicator. In some aspects, the additive element(s) may be added to the water after the reverse osmosis process has been completed, wherein the addition of the additive element(s) may produce at least one amount of treated water.

In some aspects, at 840, the treated water may be electrolyzed via one or more electrodes that may implement at least one electrolysis process on the treated water to produce at least one amount of electrolyzed water. In some embodiments, electrolyzing the treated water may facilitate the production of a plurality of nanobubbles within the treated water. In some implementations, each of the produced nanobubbles may comprise an amount of at least one gas, such as, for example and not limitation, an amount of hydrogen gas, oxygen gas, or both. In some aspects, at 850, the electrolyzed water may be energized via at least one external energy field. In some aspects, the energizing of the water may be facilitated by applying at least one external energy field to the at electrolyzed water, which may increase the zeta potential, and also the lifespan, of one or more of the nanobubbles within the water to produce at least one amount of functional hydrogen water that may cause one or more health benefits to be realized by a user after the user consumes at least one portion of the functional hydrogen water.

Figure 9:
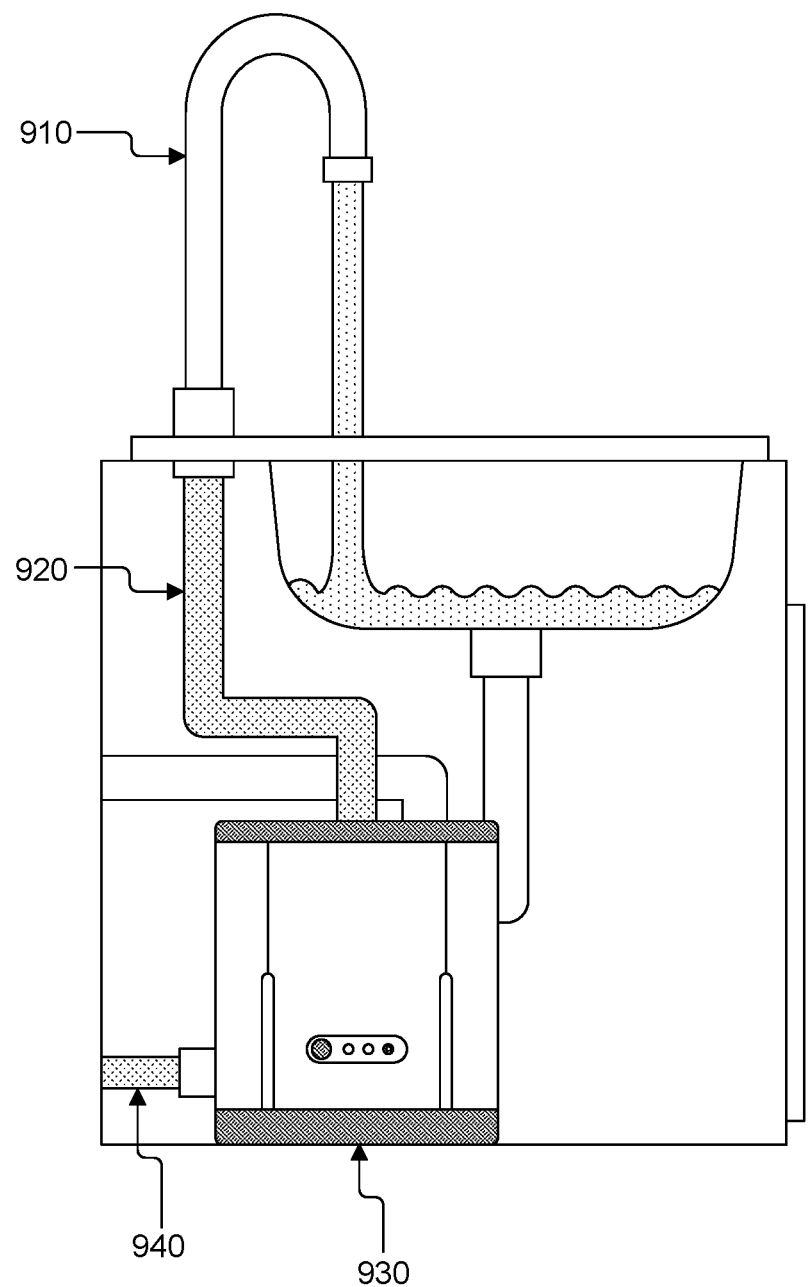
FIG. 9 illustrates an exemplary system for generating functional hydrogen water, according to some embodiments of the present disclosure.

Referring now to FIG. 9, an exemplary system 900 for generating functional hydrogen water, according to some embodiments of the present disclosure, is illustrated. In some aspects, the system 900 may comprise at least one functional hydrogen water generating apparatus 930 and at least one external water source 940. In some embodiments, the functional hydrogen water generating apparatus 930 may comprise a housing that may comprise at least one opening, wherein the opening may allow the functional hydrogen water generating apparatus 900 to receive at least one amount of water from the external water source 940. By way of example and not limitation, the external water source 940 may comprise a pipe configured to transport water from a water treatment facility or well, as non-limiting examples. In some aspects, the functional hydrogen water generating apparatus 930 may comprise at least one output aperture configured to discharge functional hydrogen water generated by the functional hydrogen water generating apparatus 930 when the output aperture is attached to at least one faucet, spigot, or similar dispenser 910 via at least one pipe 920, such that when the dispenser 910 is activated, functional hydrogen water may flow from the functional water generating apparatus 930 and out of the dispenser 910. In some implementations, this may allow a user to integrate the beneficial aspects of the functional hydrogen water generating apparatus 930 with at least one portion of an existing water system. In some aspects, the functional hydrogen water generating apparatus 930 may implement one or more of: a reverse osmosis process, the addition of one or more additive elements, an electrolysis process, or the application of at least one energy field to generate the functional hydrogen water discharged from the dispenser 910, as non-limiting examples.

Figure 10:
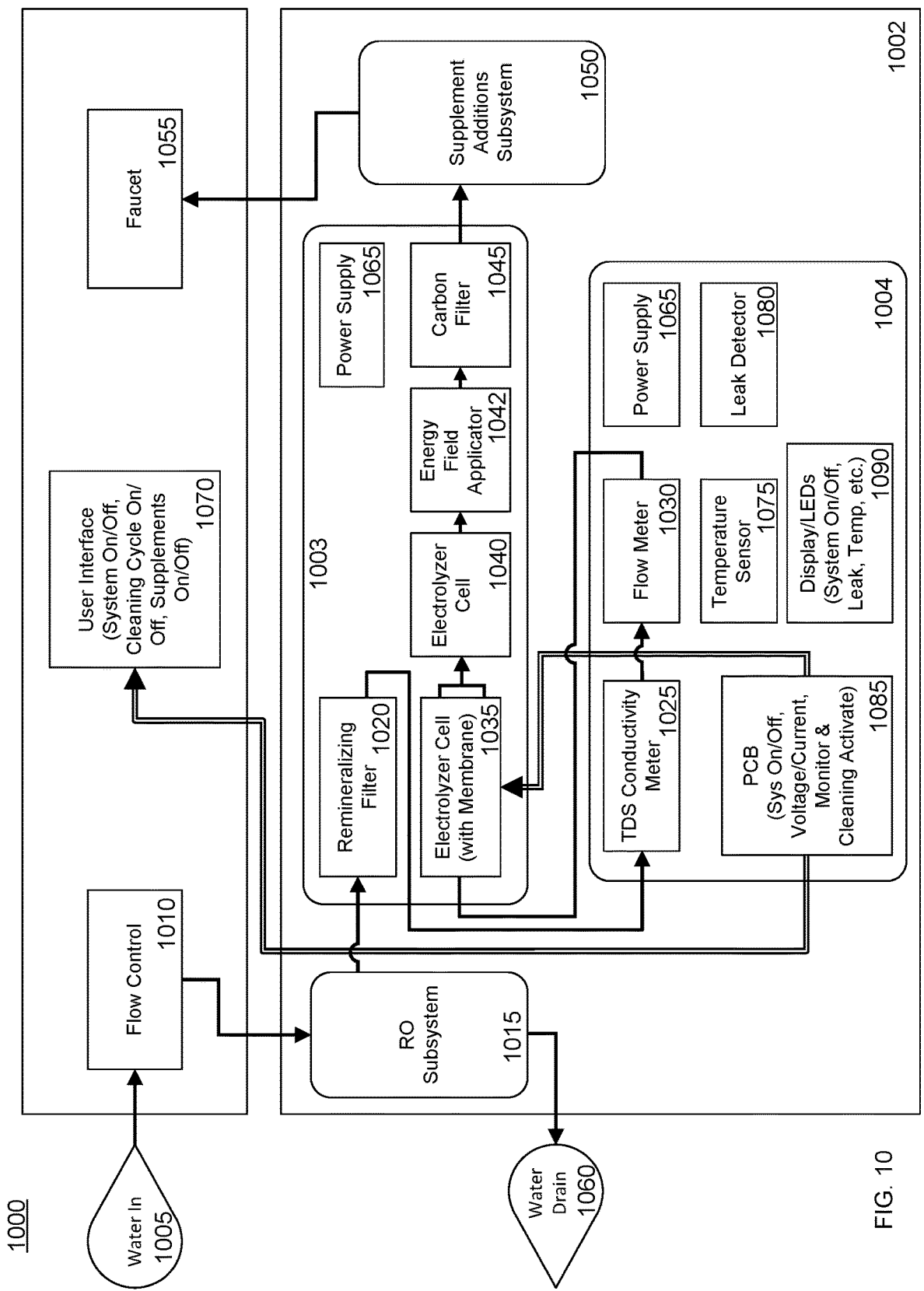
FIG. 10 illustrates a block diagram of an exemplary system for generating functional hydrogen water, according to some embodiments of the present disclosure.

Referring now to FIG. 10, a block diagram of an exemplary system 1000 for generating functional hydrogen water, according to some embodiments of the present disclosure, is illustrated. In some implementations, the system 1000 may comprise a flow-through system 1002, such as an under counter system or countertop system, as non-limiting examples. By way of example and not limitation, the flow-through system 1002 may be configured to be installed and used under or upon a countertop, within cabinetry, or under, within, or upon one or more structures, fixtures, or furnishings proximate to at least one incoming water supply of a residential or commercial building. In some embodiments, the flow-through system 1002 may comprise at least one advanced electrolysis subsystem 1003 and at least one monitoring subsystem 1004. In some implementations, the advanced electrolysis subsystem 1003 may be configured to perform at least one electrolysis process as well as provide at least one energy field, both of which may facilitate generation of functional hydrogen water. In some embodiments, the monitoring subsystem 1004 may be configured to perform one or more sensing, detection, or measuring functions to track and monitor the performance, effectiveness, or efficiency of the system 1000.

In some aspects, the system 1000 may comprise at least input 1005 for receiving at least one amount of source water. By way of example and not limitation, the input 1005 may comprise an opening, aperture, and/or pipe configured to receive a continuous flow of water entering into a commercial or residential building from at least one water treatment facility or well. In some implementations, the system 1000 may comprise at least one flow control mechanism 1010 configured to control or regulate the amount of water flowing through the system 1000. In some non-limiting exemplary embodiments, the flow control mechanism 1010 may comprise one or more valves or similar devices.

In some implementations, the system 1000 may comprise at least one RO subsystem 1015, wherein the RO subsystem 1015 may be configured to implement at least one RO process on the source water as it flows through the RO subsystem 1015 from the flow control mechanism 1010. In some aspects, once the water flows through the RO subsystem 1015, the system 1000 may direct the produced RO water to at least one remineralizing filter 1020, while any reject water produced by the RO process may be directed to at least one outlet opening, such as, for example and not limitation, a water drain 1060. In some implementations, the remineralizing filter 1020 may be configured to add at least one amount of one or more additive elements to the RO water. In some embodiments, the remineralized RO water may then be transported to at least one total dissolved solids ("TDS") conductivity meter 1025, which may be configured to measure the amount of total dissolved solids within the RO water to determine how well the RO water may conduct electricity during at least one electrolysis process.

In some aspects, the RO water may be directed through at least one flow meter 1030 configured to measure and/or regulate the amount of water flowing into a first electrolyzer cell 1035 comprising at least one membrane and a second electrolyzer cell 1040 that may not comprise a membrane, wherein the first electrolyzer cell 1035 and the second electrolyzer cell 1040 may be configured to perform at least one electrolysis process on the RO water to generate an amount of electrolyzed water. In some embodiments, the electrolyzed water may be directed to at least one energy field applicator 1042 that may be configured to expose the electrolyzed water to at least one energy field (such as, for example and not limitation, an amount of electromagnetic energy, ultraviolet radiation, magnetic energy, an energy vortex, or any other form of energy to which water may be exposed, as well as any combination thereof), wherein exposing the electrolyzed water to at least one energy field may transform the water into an amount of functional hydrogen water. In some implementations, the functional hydrogen water may be directed through at least one carbon filter 1045 or similar filtering device to remove one or more contaminants or other potentially harmful or otherwise undesirable additives or substances from the functional hydrogen water.

In some aspects, after passing through the carbon filter 1045, the functional hydrogen water may be taken to at least one supplement additions subsystem 1050. In some implementations, the supplement additions subsystem 1050 may be configured to add one or more minerals, vitamins, elements, substances, or compounds to the functional hydrogen water to give the functional hydrogen water one or more desired properties or characteristics. By way of example and not limitation, the supplement additions subsystem 1050 may add one or more minerals or vitamins to the water that may enhance the taste of the water or that may provide one or more health benefits to a user when consumed, as non-limiting examples. In some aspects, functional hydrogen water flowing out of the supplement additions subsystem 1050 may be discharged or dispensed from at least one faucet 1055 or similar outlet device or structure, such as a spigot, pipe, or hose, as non-limiting examples.

In some implementations, the system 1000 may comprise one or more electronic devices or components. In some embodiments, such electronic devices or components may at least partially facilitate the performance or functionality of the system 1000. In some aspects, the system 1000 may comprise at least one power source 1065. By way of example and not limitation, each power source 1065 may comprise one or more of: at least one battery, at least one rechargeable battery, an amount of alternating electrical current from an external energy source, an amount of direct electrical current from an external energy source, or at least one photovoltaic cell, as non-limiting examples. In some implementations, the system 1000 may comprise a plurality of power sources 1065. In some non-limiting exemplary embodiments, a first power source 1065 may be configured to power the advanced electrolysis subsystem 1003 and a second power source 1065 may be configured to power the monitoring subsystem 1004, wherein the first power source 1065 and the second power source 1065 may comprise the same or different types or forms of power sources 1065.

In some aspects, the system 1000 may comprise at least one controller, such as, for example and not limitation, at least one printed circuit board ("PCB") 1085. In some implementations, the PCB 1085 may be communicatively coupled to one or more of the other devices or components of the system 1000 such that the PCB 1085 may be configured to control, regulate, or otherwise direct the performance, operation, or functionality of the components and devices of the system 1000. By way of example and not limitation, the PCB 1085 may be configured to alter one or more portions or subsystems of the system 1000 between a powered on state and a powered off state, monitor the voltage or electrical current flow within one or more portions of the system 1000, or activate at least one cleaning cycle for the system 1000, as non-limiting examples. In some aspects, the PCB 1085 may be communicatively coupled to the first electrolyzer cell 1035 and/or the second electrolyzer cell 1040 to monitor the current and voltage of one or more electrodes within the first electrolyzer cell 1035 and/or the second electrolyzer cell 1040 during at least one electrolysis process taking place therein.

In some implementations, the PCB 1085 may be communicatively coupled to at least one user interface 1070. By way of example and not limitation, the user interface 1070 may comprise one or more of: a touchscreen, a display screen, a keyboard, a keypad, a microphone, a camera, a motion detector, an indicator light, or an audio emitting device, such as a speaker, as well as any similar devices or mechanisms that may facilitate user interaction with the system 1000. In some non-limiting exemplary embodiments, the user interface 1070 may allow a user to alter one or more operating parameters of one or more portions of the system 1000 between a powered on state and a powered off state, activate or deactivate a cleaning cycle or process of the system 1000, or alter the supplement additions subsystem 1050 between an on or activated state and an off or deactivated state, as non-limiting examples, as well as to control one or more other portions or components of the system 1000.

In some aspects, the system 1000 may comprise one or more sensors, detectors, or similar devices or mechanisms configured to receive data that may be used by the PCB 1085 or similar controller to monitor, track, or measure one or more aspects associated with the functioning of the system 1000 or to adjust the functionality or performance of one or more components of the system 1000. By way of example and not limitation, the system 1000 may comprise one or more of: at least one temperature sensor 1075 or at least one leak detector 1080. In some implementations, one or more of the sensors or detectors of the system 1000 may be communicatively coupled to at least one display mechanism 1090, such as, for example and not limitation, a display screen or an indicator light (e.g., a light-emitting diode or other light source). In some non-limiting exemplary embodiments, the display mechanism 1090 may be configured to indicate whether the system 1000 is in a powered on state or a powered off state, whether at least one leak has been detected by the leak detector 1080, or a temperature measurement associated with at least one portion of the system 1000, such as, for example and not limitation, the temperature of an amount of water within at least one portion of the system 1000, as may be measured by the temperature sensor 1075, as non-limiting examples.

Figure 11:
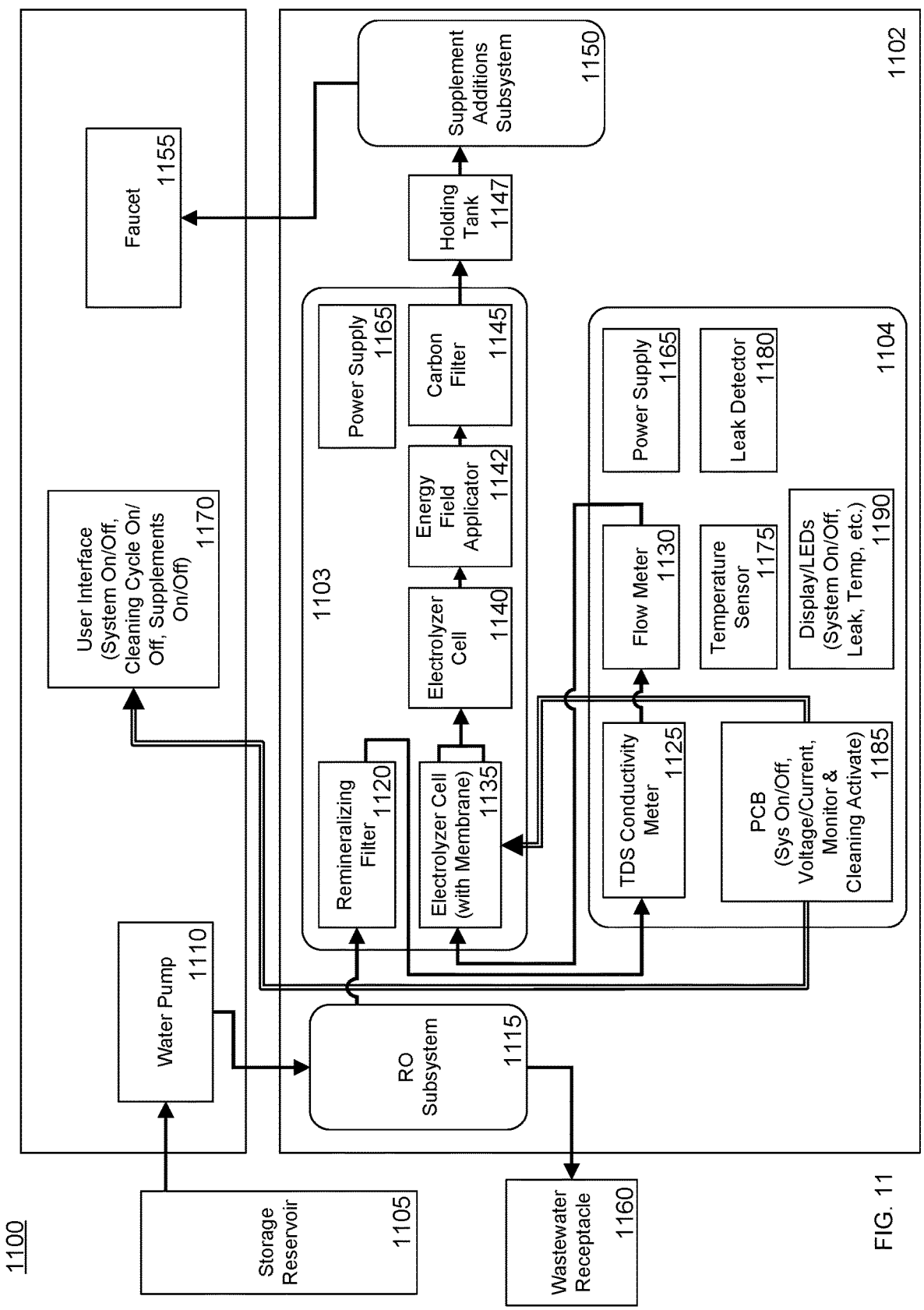
FIG. 11 illustrates a block diagram of an exemplary system for generating functional hydrogen water, according to some embodiments of the present disclosure.

Referring now to FIG. 11, a block diagram of an exemplary system 1100 for generating functional hydrogen water, according to some embodiments of the present disclosure, is illustrated. In some implementations, the system 1100 may comprise a bulk or batch system 1102. By way of example and not limitation, the batch system 1102 may be configured to be installed and used upon a countertop or upon one or more structures, fixtures, or furnishings configured anywhere of a user's choosing. In some embodiments, the batch system 1102 may comprise at least one advanced electrolysis subsystem 1103 and at least one monitoring subsystem 1104. In some implementations, the advanced electrolysis subsystem 1103 may be configured to perform at least one electrolysis process as well as provide at least one energy field, both of which may facilitate generation of functional hydrogen water. In some embodiments, the monitoring subsystem 1104 may be configured to perform one or more sensing, detection, or measuring functions to track and monitor the performance, effectiveness, or efficiency of the system 1100.

In some aspects, the system 1100 may comprise at least one storage reservoir 1105 configured to receive, via at least one opening, and at least temporarily store at least one amount of source water. By way of example and not limitation, the storage reservoir 1105 may comprise at least one opening, aperture, and/or pipe through which water may be pumped out of the storage reservoir 1105 via at least one water pump 1110. In some implementations, the water pump 1110 may facilitate flow of the source water to at least one RO subsystem 1115.

In some implementations, the RO subsystem 1115 may be configured to implement at least one RO process on the source water as it flows through the RO subsystem 1115 from the water pump 1110. In some aspects, once the water flows through the RO subsystem 1115, the system 1100 may direct the RO water to at least one remineralizing filter 1120, while any reject water produced by the RO process may be directed to at least one wastewater receptacle 1160, from which water may be subsequently drained by a user by removing a plug or lid, or by removing the wastewater receptacle 1160 from the system 1100 and emptying the contents of the wastewater receptacle 1160 through at least one opening or aperture. In some implementations, the remineralizing filter 1120 may be configured to add at least one amount of one or more additive elements to the RO water. In some embodiments, the remineralized RO water may then be transported to at least one TDS conductivity meter 1125, which may be configured to measure the amount of total dissolved solids within the RO water to determine how well the RO water may conduct electricity during at least one electrolysis process.

In some aspects, the RO water may be directed through at least one flow meter 1130 configured to measure and/or regulate the amount of water flowing into a first electrolyzer cell 1135 comprising at least one membrane and a second electrolyzer cell 1140 that may not comprise a membrane, wherein the first electrolyzer cell 1135 and the second electrolyzer cell 1140 may be configured to perform at least one electrolysis process on the RO water to generate an amount of electrolyzed water. In some embodiments, the electrolyzed water may be directed to at least one energy field applicator 1142 that may be configured to expose the electrolyzed water to at least one energy field energy field (such as, for example and not limitation, an amount of electromagnetic energy, ultraviolet radiation, magnetic energy, an energy vortex, or any other form of energy to which water may be exposed, as well as any combination thereof), wherein exposing the electrolyzed water to at least one energy field may transform the water into an amount of functional hydrogen water. In some implementations, the functional hydrogen water may be directed through at least one carbon filter 1145 or similar filtering device to remove one or more contaminants or other potentially harmful or otherwise undesirable additives or substances from the functional hydrogen water.

In some aspects, after passing through the carbon filter 1145, the functional hydrogen water may be taken to at least one holding tank 1147. In some non-limiting exemplary embodiments, the holding tank 1147 may be configured such that upon the opening of at least one valve, spigot, spout, or faucet 1155 by a user, gravitational forces and/or one or more pumping mechanisms may cause water from the holding tank 1147 to flow through at least one supplement additions subsystem 1150. In some implementations, the supplement additions subsystem 1150 may be configured to add one or more minerals, vitamins, elements, substances, or compounds to the functional hydrogen water to give the functional hydrogen water one or more desired properties or characteristics. By way of example and not limitation, the supplement additions subsystem 1150 may add one or more minerals or vitamins to the water that may enhance the taste of the water or that may provide one or more health benefits to a user when consumed, as non-limiting examples. In some aspects, functional hydrogen water flowing out of the supplement additions subsystem 1150 may be discharged or dispensed from the open faucet 1155 or similar outlet device or structure, such as a spout, spigot, pipe, or hose, as non-limiting examples.

In some implementations, the system 1100 may comprise one or more electronic devices or components. In some embodiments, such electronic devices or components may at least partially facilitate the performance or functionality of the system 1100. In some aspects, the system 1100 may comprise at least one power source 1165. By way of example and not limitation, each power source 1165 may comprise one or more of: at least one battery, at least one rechargeable battery, an amount of alternating electrical current from an external energy source, an amount of direct electrical current from an external energy source, or at least one photovoltaic cell, as non-limiting examples. In some implementations, the system 1100 may comprise a plurality of power sources 1165. In some non-limiting exemplary embodiments, a first power source 1165 may be configured to power the advanced electrolysis subsystem 1103 and a second power source 1165 may be configured to power the monitoring subsystem 1104, wherein the first power source 1165 and the second power source 1165 may comprise the same or different types or forms of power sources 1165.

In some aspects, the system 1100 may comprise at least one controller, such as, for example and not limitation, at least one PCB 1185. In some implementations, the PCB 1185 may be communicatively coupled to one or more of the other devices or components of the system 1100 such that the PCB 1185 may be configured to control, regulate, or otherwise direct the performance, operation, or functionality of the components and devices of the system 1100. By way of example and not limitation, the PCB 1185 may be configured to alter one or more portions or subsystems of the system 1100 between a powered on state and a powered off state, monitor the voltage or electrical current flow within one or more portions of the system 1100, or activate at least one cleaning cycle for the system 1100, as non-limiting examples. In some aspects, the PCB 1185 may be communicatively coupled to the first electrolyzer cell 1135 to monitor the current and voltage of one or more electrodes within the first electrolyzer cell 1135 during at least one electrolysis process taking place therein.

In some implementations, the PCB 1185 may be communicatively coupled to at least one user interface 1170. By way of example and not limitation, the user interface 1170 may comprise one or more of: a touchscreen, a display screen, a keyboard, a keypad, a microphone, a camera, a motion detector, an indicator light, or an audio emitting device, such as a speaker, as well as any similar devices or mechanisms that may facilitate user interaction with the system 1100. In some non-limiting exemplary embodiments, the user interface 1170 may allow the user to alter one or more operating parameters of one or more portions of the system 1100 between a powered on state and a powered off state, activate or deactivate a cleaning cycle or process of the system 1100, or alter the supplement additions subsystem 1150 between an on or activated state and an off or deactivated state, as non-limiting examples.

In some aspects, the system 1100 may comprise one or more sensors, detectors, or similar devices or mechanisms configured to receive data that may be used by the PCB 1185 or similar controller to monitor, track, or measure one or more aspects associated with the functioning of the system 1100 or to adjust the functionality or performance of one or more components of the system 1100. By way of example and not limitation, the system 1100 may comprise one or more of: at least one temperature sensor 1175 or at least one leak detector 1180. In some implementations, one or more of the sensors or detectors of the system 1100 may be communicatively coupled to at least one display mechanism 1190, such as, for example and not limitation, a display screen or an indicator light (e.g., a light-emitting diode or other light source). In some non-limiting exemplary embodiments, the display mechanism 1190 may be configured to indicate whether the system 1100 is in a powered on state or a powered off state, whether at least one leak has been detected by the leak detector 1180, or a temperature measurement associated with at least one portion of the system 1100, such as, for example and not limitation, the temperature of an amount of water within at least one portion of the system 1100 may be measured by the temperature sensor 1175, as non-limiting examples.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. An apparatus for generating water with prolonged lifespan hydrogen molecules, comprising:
   at least one pre-filtration mechanism, wherein the at least one pre-filtration mechanism is configured to remove one or more contaminants from at least one amount of water;
   at least one additive element applicator, wherein the at least one additive element applicator is configured to add at least one additive element to the at least one amount of water to generate at least one amount of treated water;
   a plurality of electrodes, wherein the plurality of electrodes comprises at least one anode and at least one cathode, wherein the plurality of electrodes is configured to implement at least one electrolysis process on the at least one amount of treated water to produce at least one amount of electrolyzed water comprising a plurality of nanobubbles of hydrogen molecules, wherein each of the plurality of electrodes is a mesh electrode coated with polytetrafluoroethylene; and
   at least one energy field applicator, wherein the at least one energy field applicator is configured to apply at least one energy field to the at least one amount of electrolyzed water wherein the at least one energy field comprises electromagnetic energy to increase a zeta potential of each of the nanobubbles and produces at least one amount of water with prolonged lifespan hydrogen molecules.

2. The apparatus of claim 1, wherein the at least one additive element comprises one or more of:
   calcium, magnesium, potassium, silicon, or sodium.

3. The apparatus of claim 1, wherein each of the mesh electrodes comprises consecutive adjacent vertical and horizontal wire segments, and wherein the adjacent horizontal wire segments are separated by a distance of 10 nm to 1000 nm.

4. The apparatus of claim 3, wherein the adjacent horizontal wire segments are separated by a distance of 100 nm.

5. The apparatus of claim 1, wherein the at least one anode and the at least one cathode are separated by a distance ranging from approximately 0.5 millimeters to approximately 10 millimeters.

6. The apparatus of claim 1, wherein each of the plurality of electrodes comprises a thickness ranging from approximately 0.1 millimeters to approximately 2.0 millimeters.

7. The apparatus of claim 1, wherein the at least one energy field applicator comprises one or more of: a light source, an ultraviolet light source, a magnet, an electromagnet, or a power source.

8. The apparatus of claim 1, wherein the zeta potential of each of the nanobubbles comprises an electrostatic surface potential, and wherein the electrostatic surface potential of each of the nanobubbles is 0 mV to −100 mV.

9. The apparatus of claim 1, wherein the at least one pre-filtration mechanism comprises at least one reverse osmosis mechanism.

10. The apparatus of claim 9, wherein the at least one reverse osmosis mechanism comprises at least one semipermeable membrane.

11. The apparatus of claim 1, wherein the apparatus further comprises at least one post-filtration mechanism configured to remove an additional one or more contaminants from the at least one amount of water with prolonged lifespan hydrogen molecules.

12. The apparatus of claim 11, wherein the at least one post-filtration mechanism comprises a carbon filter.

13. A method for generating water with prolonged lifespan hydrogen molecules, comprising:
receiving at least one amount of water from at least one water source;
executing at least one reverse osmosis process on the at least one amount of water, wherein the at least one reverse osmosis process is configured to remove at least one contaminant from the at least one amount of water;
adding at least one trace element to the at least one amount of water to generate at least one amount of treated water;
implementing at least one electrolysis process on the at least one amount of treated water to generate at least one amount of electrolyzed water, wherein the at least one electrolysis process is at least partially implemented via a plurality of electrodes, wherein the at least one amount of electrolyzed water comprises a plurality of nanobubbles of hydrogen molecules, wherein each of the plurality of electrodes is a mesh electrode coated with polytetrafluoroethylene; and
exposing the at least one amount of electrolyzed water to at least one energy field via at least one energy field applicator, wherein the at least one energy field comprises electromagnetic energy to increase a zeta potential of each of the nanobubbles and to generate at least one amount of water with prolonged lifespan hydrogen molecules.

14. The method of claim 13, wherein each of the mesh electrodes comprises consecutive adjacent vertical and horizontal wire segments, and wherein the adjacent horizontal wire segments are separated by a distance of 10 nm to 1000 nm.

15. The method of claim 14, wherein the adjacent horizontal wire segments are separated by a distance of 100 nm.

16. The method of claim 13, wherein the zeta potential of each of the nanobubbles comprises an electrostatic surface potential, and wherein the electrostatic surface potential of each of the nanobubbles is 0 mV to −100 mV.

* * * * *